Oct. 4, 1966     A. B. ELLIOTT, JR     3,277,362
PHASE CONTROL DEVICE
Filed Feb. 6, 1963
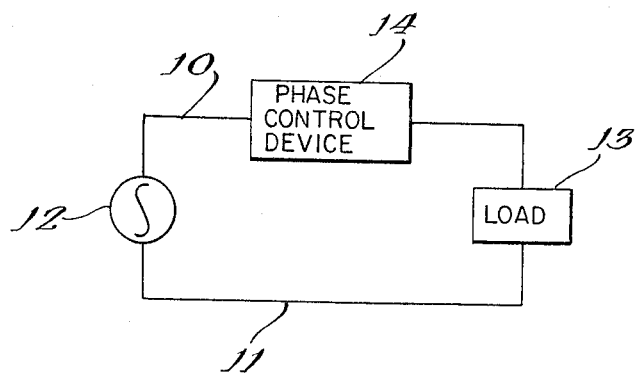
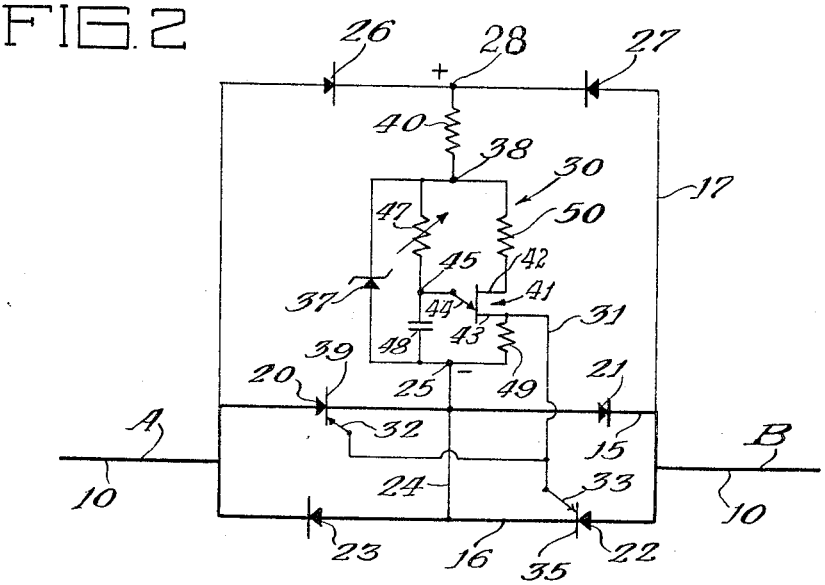
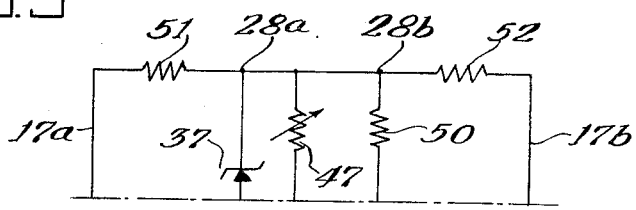
Inventor:
Andrew Byron Elliott, Jr.

3,277,362
PHASE CONTROL DEVICE
Andrew Byron Elliott, Jr., River Forest, Ill., assignor to Jefferson Electric Company, Bellwood, Ill., a corporation of Delaware
Filed Feb. 6, 1963, Ser. No. 256,662
1 Claim. (Cl. 323—24)

This invention relates to an improved phase control device.

In my copending application, Serial No. 245,227, filed December 17, 1962, I have shown a solid state phase control device for use in connection with a dimming arrangement for fluorescent lamps, and I there pointed out that either a bridge type phase control device or a back to back phase control device would be suitable.

The advantage of a bridge type phase control device is that the SCR (silicon controlled rectifier) is subjected to forward voltage only. However, it does have the disadvantage in that there are at all times three power components connected in series circuit, each one of which is a source of power loss.

The back to back arrangement requires fewer power components, thus resulting in less power loss, but a much more costly SCR is required because the SCR is subjected to reverse voltage.

It is an object of the present invention to provide an improved phase control device which has fewer power components than the bridge type device and in which the power components are arranged so that the SCR's are not subjected to reverse voltage, thus permitting the use of lower cost SCR's.

According to my invention, I provide a modified back to back arrangement which prevents the opposite SCR from being subjected to reverse voltage while the first SCR is in forward blocking condition, and vice versa. The present arrangement can be called an offset back to back type, in which each SCR is in series with a rectifier diode, the components of each leg being offset from each other and a mid-point cross connection being provided between the two legs so that the cathode of the opposite SCR is always at the anode potential while the first SCR is in forward blocking condition.

Another advantage of the present invention is that no coupling circuit, such as a pulse transformer, is required in order to apply the gate signal to both SCR's.

To summarize the foregoing, I provide a phase control arrangement which utilizes two SCR's as in a conventional back to back arrangement, but which provides direct coupling to both SCR gates, and the two SCR's are subjected to voltage in the forward direction only.

According to one aspect of my invention, the two rectifier diodes perform two functions; they are a part of the bridge for the trigger circuit, and they also substitute for the reverse voltage blocking requirement which is usually imposed on the SCR's in a conventional back to back arrangement.

Other objects, features and advantages will become apparent as the description proceeds.

With reference now to the drawings in which like reference numerals designate like parts:

FIG. 1 is a diagram showing the relationship of the phase control device to the other elements of the circuit;

FIG. 2 is a circuit diagram showing a preferred embodiment of my invention; and

FIG. 3 is a diagram showing a modification of the circuit of FIG. 2.

In FIG. 1 the circuit includes a pair of leads 10 and 11 which connect an alternating current power source 12 with a load 13. The phase control device 14 is interposed in the lead 10, so that it is in series circuit with the elements 12 and 13. The phase control device by regulating the point in each half cycle at which the device shifts from current blocking condition to current conducting condition regulates the power that is supplied to the load 13.

When the phase control device is in blocking condition, there will be a potential drop across it, the left hand portion of lead 10 being at potential A and the right hand portion being at potential B.

The phase control device, as shown in FIG. 2, comprises a circuit having two power legs 15 and 16 and a trigger supply leg 17, all being connected in parallel with each other across the two halves of the lead 10.

The power leg 15 comprises an SCR 20 and a power rectifier diode 21 in series with each other and facing in the same direction. The power leg 16 provides an SCR 22 and a power rectifier diode 23 connected in series with each other and each facing in the opposite direction as the elements 20 and 21. A lead 24 connects the midpoints of each leg and also provides a terminal 25 which is negative.

The trigger supply leg 17 includes two control diodes 26 and 27 facing in opposite directions toward a midpoint terminal 28 which is positive. A trigger device 30 is connected between the terminals 25 and 28. The output lead 31 of the trigger device 30 is connected to both of the gates 32, 33 of the SCR's 20 and 22, respectively.

In operation, positive current flowing from left to right passes through the power leg 15, and that flowing from right to left passes through the power leg 16. When SCR 20 is forward blocking, the entire potential drop, A minus B, will be across it with the result that the cathode 39 of SCR 20 is at B potential. Due to the mid-point connection 24, the cathode 35 of SCR 22 will also be at B potential. In other words, the power rectifier 21 short circuits the SCR 22 with the result that it is not subjected to any reverse voltage, and this is true irrespective of any reverse voltage leakage across the power rectifier 23.

In the same manner, when the SCR 22 is forward blocking, the power rectifier 23 shunts the SCR 20 so that its cathode 34 is at A potential.

The trigger device 30 comprises a relaxation oscillator connected in parallel with a zener diode 37 across negative terminal 25 and a junction point 38. A dropping resistor 40 is connected between junction point 38 and the positive terminal 28.

The relaxation oscillator includes a unijunction transistor 41 connected between points 38 and 25, and having a base-two 42, a base-one 43, and an emitter 44. The base-one 43 is connected to the output lead 31, and the emitter 44 is connected to a junction point 45 in an RC charging circuit, the latter comprising a series resistance 47 and a capacitor 48.

The capacitor 48 is charged at a rate determined by the series resistance 47. When the emitter break-over voltage is reached, the condenser 48 discharges through a resistance 49 which is connected between the base-one 43 and the terminal 25. Thus, a pulse is applied to the gates 32 and 33, which will be positive with respect to one of the cathodes 34, 35. The pulse thus triggers the forward blocking SCR into a conductive state.

As an example of suitable quantities, the zener 37 may be a 22 volt zener, and the dropping resistor 40 may be 18,000 ohms. A 330 ohm resistance 50 is connected between the base-two 42 and the junction point 38. The resistance 49 is 47 ohms. Also, a 10,000 ohm resistance, not shown, may preferably be connected in parallel across the zener 37 to dampen the rate of voltage build-up. In the RC charging circuit, the resistance 47 may be a 75,000 ohm variable resistance, and the condenser 48 is .12 mfd.

Regulation of the variable resistance 47 controls the point in each half cycle at which the forward blocking SCR 20 or 22 switches from the blocking to the conducting state, and thus controls the area under the wattage half cycle curve.

In the modification of FIG. 3, resistors 51 and 52 are substituted for the control diodes 26 and 27. The leads 17a and 17b are the leads of the trigger supply leg 17. The terminals 28a and 28b are of common potential and correspond to the mid-point terminal 28, and also to the junction point 38 of FIG. 2. The resistor 51 is connected between the lead 17a and the terminal 28a and the resistor 52 is connected between the lead 17b and terminal 28b. The resistors 51 and 52 dispense also with the need for the dropping resistor 40. The resistors 50 and 51 can be matched to give the degree of wave shape symmetry required.

In either arrangement, the power rectifiers 21 and 23 form the two negative arms of the trigger supply bridge. Since the peak value of the control current drawn by the trigger device 30 is of the order of only a few milliamperes, inexpensive control diodes 26 and 27 can be used in the FIG. 2 circuit. In the FIG. 3 circuit, the resistors 51 and 52 are 18,000 ohm resistors, with the result that any current leakage through the trigger supply leg 17 is negligible, and will not detract from the effectiveness of the phase control device 10.

Although only preferred embodiments of my invention have been shown and described herein, it will be understood that various modifications and changes may be made in the constructions shown without departing from the spirit of my invention as pointed out in the appended claim.

I claim:

A phase control device comprising a circuit having three legs connected in parallel with each other, namely, a first power leg, a second power leg, and a trigger supply leg, each power leg including an SCR and a power rectifier diode connected in series, with said power rectifier diode being located forwardly of its associated SCR, and with the SCR and power rectifier diode of one leg facing in the same direction as each other and in the opposite direction as the SCR and power rectifier diode of the other leg so as to provide an offset back to back arrangement, a mid-point cross connection between said power legs providing a negative terminal, said trigger supply leg including two resistors of equal value and a mid-point terminal means, and also including means connecting said resistors to one of said power legs, a trigger device connected between said mid-point terminal means and said negative terminal, and including an output lead, and means connecting said output lead to the gates of both of said SCR's.

References Cited by the Examiner

UNITED STATES PATENTS

| | | | |
|---|---|---|---|
| 3,040,239 | 6/1962 | Walker | 323—24 |
| 3,120,633 | 2/1964 | Genuit | 321—45 |
| 3,120,634 | 2/1964 | Genuit | 321—45 |
| 3,146,392 | 8/1964 | Sylvan | 323—22 |
| 3,152,299 | 10/1964 | Leney | 323—22 |

JOHN F. COUCH, *Primary Examiner.*

LLOYD McCOLLUM, *Examiner.*

D. L. RAE, K. D. MOORE, *Assistant Examiners.*